United States Patent
Desvignes et al.

(10) Patent No.: US 10,525,532 B2
(45) Date of Patent: Jan. 7, 2020

(54) PROCESS FOR POWDER-BASED ADDITIVE MANUFACTURING OF A PART, IN PARTICULAR A LINING BLADE FOR A TIRE MOULD

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Jean-Claude Desvignes, Clermont-Ferrand (FR); Pierre Pays, Clermont-Ferrand (FR); Damien Leblay, Clermont-Ferrand (FR); Christian Gomet, Clermont-Ferrand (FR); Alexandre Reeb, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 311 days.

(21) Appl. No.: 15/329,782

(22) PCT Filed: Jul. 24, 2015

(86) PCT No.: PCT/EP2015/067041
§ 371 (c)(1),
(2) Date: Jan. 27, 2017

(87) PCT Pub. No.: WO2016/016136
PCT Pub. Date: Feb. 4, 2016

(65) Prior Publication Data
US 2017/0216922 A1    Aug. 3, 2017

(30) Foreign Application Priority Data

Jul. 28, 2014  (FR) ...................... 14 57259

(51) Int. Cl.
*B22F 5/00*     (2006.01)
*B22F 3/105*    (2006.01)
(Continued)

(52) U.S. Cl.
CPC ............ *B22F 5/007* (2013.01); *B22F 3/1055* (2013.01); *B29C 33/3842* (2013.01);
(Continued)

(58) Field of Classification Search
CPC ................................ B33Y 10/00; B22F 5/007
See application file for complete search history.

(56) References Cited

U.S. PATENT DOCUMENTS 5,155,324 A     10/1992  Deckard et al.
2002/0139164 A1  10/2002  Ishihara
(Continued)

FOREIGN PATENT DOCUMENTS

EP    0758743    2/1997
EP    0868955    10/1998
(Continued)

*Primary Examiner* — Weiping Zhu
(74) *Attorney, Agent, or Firm* — Cozen O'Connor

(57) ABSTRACT

Process for additive manufacturing of at least one part. At least one layer of powder is deposited on a working surface using a layering device for distributing the powder mobile in translation along the surface and at least partly fusing the layer deposited using a beam of energy. The depositing and fusing steps are repeated in order to form the part by stacking of fused layers. The distribution component of the layering device is mobile in a direction substantially parallel to the direction of the length of each fused layer of the part. The depositing and fusing steps are repeated in order to form the part so that the length of the part extends along a direction substantially parallel to the stacking direction of the fused layers and so that the head of the part is oriented substantially perpendicular to the working surface.

10 Claims, 2 Drawing Sheets

(51) Int. Cl.
*B29D 30/06* (2006.01)
*B33Y 10/00* (2015.01)
*B33Y 80/00* (2015.01)
*B29C 33/38* (2006.01)

(52) U.S. Cl.
CPC .......... *B29D 30/0606* (2013.01); *B33Y 10/00* (2014.12); *B33Y 80/00* (2014.12); *B22F 2003/1056* (2013.01); *B29D 2030/0613* (2013.01)

(56) References Cited

U.S. PATENT DOCUMENTS

2004/0031780 A1    2/2004   Hagemeister et al.
2006/0236544 A1*   10/2006   Huskamp ............. B21C 23/145
                                                                                                                                       29/897.3

FOREIGN PATENT DOCUMENTS

| FR | 2974316 | 2/1951 |
| FR | 2961741 | 12/2011 |
| FR | 2991613 | 12/2013 |
| WO | WO 2010/030276 | 3/2010 |
| WO | WO 2013/178825 | 12/2013 |

\* cited by examiner

PROCESS FOR POWDER-BASED ADDITIVE MANUFACTURING OF A PART, IN PARTICULAR A LINING BLADE FOR A TIRE MOULD

RELATED APPLICATIONS

This is a U.S. National Phase Application under 35 USC 371 of International Application PCT/EP2015/067041 filed on Jul. 24, 2015.

This application claims the priority of French application no. 1457259 filed Jul. 28, 2014, the entire content of which is hereby incorporated by reference.

FIELD OF THE INVENTION

The present invention relates to a process for powder-based additive manufacturing by sintering or melting grains of said powder using a beam of energy. A "beam of energy" means electromagnetic radiation (for example a laser beam) or a beam of particles (for example an electron beam).

BACKGROUND OF THE INVENTION

One particularly advantageous application of the invention relates to the manufacture of lining elements, such as blades, of a sectored-type curing or vulcanizing mould for vehicle tires.

This type of mould mainly comprises two shells that each mould one of the lateral sidewalls of the tire, a plurality of sectors that mould the tread of said tire and are radially movable between an open position and a closed position of the mould. The shells and the sectors define an inner space that is intended to be brought into contact with the unvulcanized green form of the tire. In order to form the tread patterns, blades are attached to the sectors of the mould and protude into this inner space. For further details on a mould comprising such blades, reference could for example be made to documents EP-B1-1 758 743 and US-A1-2002/0139164.

The advantage of manufacturing by selective melting of superposed layers of powder, more commonly referred to as sintering, mainly lies in the fact that the shape of these blades may be modelled by a computer and that the blades may then be manufactured on the basis of this modelling by computer control of the beam of energy. In addition, this technique is highly suitable for the manufacture of elements of small sizes and of complex shapes, such as mould lining blades, which are difficult to manufacture with other processes.

When the selective melting is carried out by a laser beam, it is referred to as laser sintering. The laser sintering technique consists in manufacturing the blade layer after layer, by stacking the layers of powder, which are consolidated and fused on top of one another by the laser beam, in a stacking direction. The term "powder" is understood to mean a powder or a mixture of powders. The powder may for example be metallic or mineral, for example ceramic.

Conventionally, in order to ensure the preparation of the bed of powder prior to the sintering or melting operation, a layering device is used. Such a device mainly comprises means for storing the powder and distribution means capable of distributing the powder as a layer on a manufacturing plate. For further details on such layering devices, reference could for example be made to patent application WO-A2-2013/178825.

The first layer is deposited then welded directly to the manufacturing plate. The other layers are then formed successively so as to obtain a stack starting from the first layer.

Generally, the manufacture of a small-sized element, such as a lining blade, is carried out horizontally on the manufacturing plate so that its length is substantially parallel to the manufacturing plate. It is then referred to as horizontal-type manufacturing. This makes it possible to avoid having too high a blade height and to thus reduce the manufacturing time.

However, with such a type of manufacture, problems of non-compliance of the dimensional and geometric features may be faced. Indeed, the blades may have undulations or else bulky portions that create zones referred to as undercut zones, i.e. zones where a blade wall overhangs above a non-solidified powder zone. Such bulky portions are for example provided on the blades described in patent applications FR-A1-2 961 741 and WO-A1-2010/030276. Observed in these undercut zones of the blades are deformations, stress concentration phenomena that may generate cracks and a particularly high roughness. Furthermore, certain blade geometries cannot be manufactured because of such undercut zones.

SUMMARY OF THE INVENTION

The present invention aims to overcome these drawbacks.

More particularly, one object of the present invention is to provide a process for the additive manufacturing of at least one part by powder sintering or melting using at least one beam of energy which makes it possible to guarantee the satisfactory manufacture of parts of complex shapes that may for example have undulations and/or bulky portions and/or undercut portions.

In one embodiment, the process relates to the additive manufacturing of at least one part by powder sintering or melting using at least one beam of energy. The part comprises a main body provided with two opposite frontal faces and a one-piece head prolonging one end of the body, extending parallel to the length of said body and protuding at least with respect to one of said frontal faces.

The process comprises the following steps:
a) depositing at least one layer of powder on a working surface using a layering device comprising translatably mobile means for distributing the powder along said surface,
b) at least partly fusing said layer deposited using the beam of energy, and
c) repeating steps a) and b) in order to form the part by stacking of fused layers of the part. The distribution means of said device are mobile in a direction substantially parallel to the direction of the length of each fused layer. Steps a) and b) are repeated in order to form the part so that the length of said part extends along a direction substantially parallel to the stacking direction of the fused layers, and so that the head of the part is oriented substantially perpendicular to the working surface.

The term "length" is understood here to mean the dimension of the part in the direction of its greatest size.

The orientation of the fused layers relative to the displacement direction of the distribution means makes it possible to limit the risk of deformations of the stacked layers under the effect of forces applied by these means that may give rise to the appearance of stress concentrations and microcracks.

In addition, with this vertical-type manufacture, the obtaining of parts of complex shapes that comply with the required dimensional, geometric and surface finish features is facilitated. For a part comprising bulky portions, the deformations, or even the microcracks, caused by to the internal stresses generated in the part by heat diffusion during the melting steps are attenuated given the orientation of the bulky portions perpendicular to the working surface, these bulky portions being connected to said surface. For a part comprising undercut portions oriented perpendicular to the working surface, the roughness is not high unlike a horizontal-type manufacture in which the undercut portions rest on the non-fused layers of powder generating coarse asperities on the part.

In one preferred embodiment, a plurality of stacks of fused layers is formed in different zones of the working surface so as to simultaneously manufacture a plurality of parts. Said parts may be arranged on the working surface as a matrix of columns positioned transversely relative to the displacement direction of the distribution means of the layering device, and of rows positioned parallel to said direction.

The distribution means of the layering device may be shared by the plurality of stacks of fused layers.

In one embodiment, the parts of each column and of each row are aligned relative to one another. Alternatively, each part of a column is offset along the displacement direction of the distribution means relative to the immediately adjacent part of said column.

Advantageously, the length of the part extends along a direction forming an angle of between −20° and +20° with the stacking direction of the layers.

In one preferred embodiment, the part is oriented so that the distribution means of the layering device bear firstly against the main body then next against the head of said part during the displacement thereof.

In one embodiment, the distribution means of the layering device comprise at least one roller. Preferably, the axis of the roller is oriented substantially perpendicular to the direction of the length of each fused layer of the part. Said part may generally have a rectangular shape.

BRIEF DESCRIPTION OF THE DRAWINGS

Other objectives, features and advantages will appear on reading the following detailed description given solely by way of nonlimiting example and with reference to the appended drawings in which.

DETAILED DESCRIPTION OF THE DRAWINGS

Figure 1:
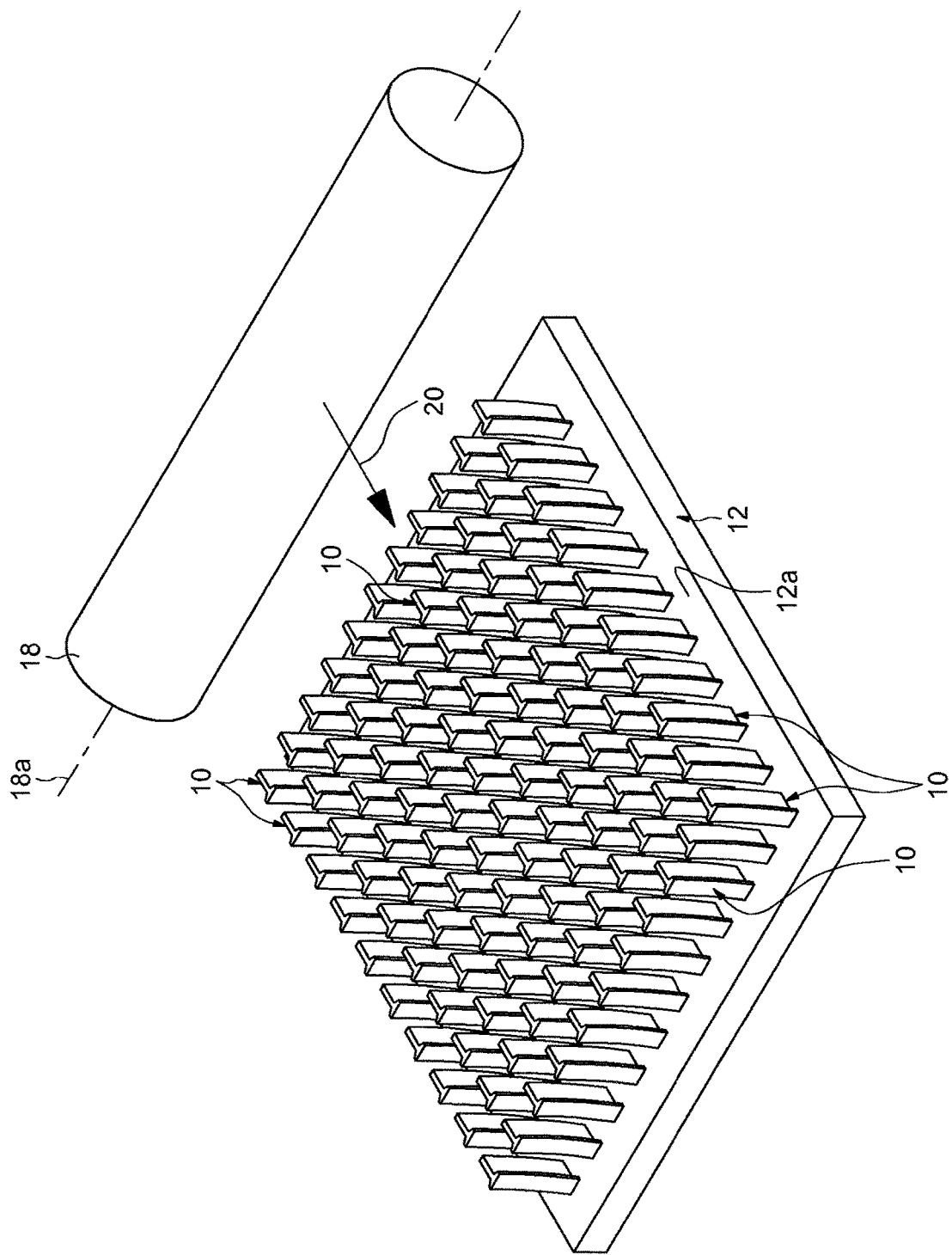
FIG. 1 is a schematic perspective view partially illustrating a process for manufacturing blades by laser sintering according to a first example of implementation.

Represented in FIG. 1 is an arrangement of identical blades 10 which are intended for a tire vulcanizing mould and are formed on a manufacturing plate 12 represented in an assumed horizontal position. The plate 12 comprises an upper surface forming a working surface 12a on which the blades 10 are formed. The blades 10 are identical to one another.

Figure 2:
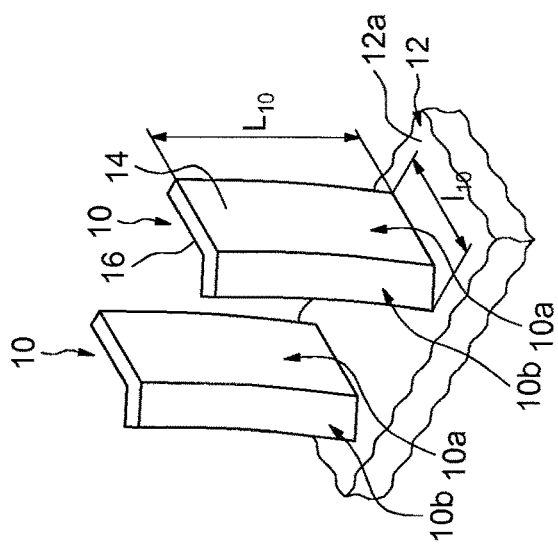
FIG. 2 is a detail view of two blades from FIG. 1, and FIGS. 3 and 4 are detailed views of two blades according to second and third examples of implementation of the process.

As illustrated more clearly in FIG. 2, each blade 10 has a substantially rectangular general shape of length $L_{10}$ and of width $l_{10}$. The length $L_{10}$ of the blade extends substantially perpendicular relative to the working surface 12a of the manufacturing plate, i.e. here substantially vertically. The blades 10 are oriented or extend substantially vertically. The blades 10 extend longitudinally in a direction secant to the working surface 12a.

The blade 10 here has a curved shape. In the embodiment illustrated, each blade 10 comprises a main body 10a and a head 10b made in one piece with said body. The body 10a comprises two opposite main frontal faces 14, 16 and two opposite lateral end faces (not referenced) delimiting said frontal faces. The frontal faces 14, 16 delimit the thickness of the body 10a of the blade. In the exemplary embodiment illustrated, the main faces 14, 16 are substantially flat.

The head 10b prolongs one end of the body 10a and extends parallel to the length of said body. The head 10b prolongs one of the end faces of the body. The head 10b protrudes laterally on either side of the body 10a. The head 10b protudes with respect to the main faces 14, 16. The head 10b has a portion that is bulkier than the main body 10a. The head 10b here has a a substantially cylindrical shape with a triangular cross section. As a variant, the cross section of the head could have any other shape, for example rectangular, square, circular, etc., or else V-shaped or U-shaped. The blade 10 is capable of enabling the moulding of a water drop pattern in the tread of the tire. More specifically, the lower portion of the body 10a is intended to be anchored in a sector of the mould for vulcanizing the tire, whereas the upper portion of the body 10a and the head 10b are intended to protude above the moulding surface of the sector of the mould for moulding the pattern in the tread of the tire.

The following procedure is used for the manufacture of the plurality of blades 10. In a first step, a first layer of powder is deposited on the working surface 12a of the manufacturing plate. After deposition, the first layer extends substantially horizontally over the working surface 12a. The powder may for example be metallic or mineral, for example ceramic.

All of the means enabling the application of a layer of powder to the working surface 12a of the manufacturing plate are referred to as the "layering device". The layering device comprises a roller 18 for distributing the powder over the working surface 12a. The role of the roller 18 is to distribute a thin thickness of powder over the working surface 12a. The roller 18 comprises an axis 18a of rotation and is rotatably mobile about said axis. Each blade 10 is oriented perpendicular to the axis 18a of the roller of the distribution means.

The layering device may also comprise means for storing the powder supplying the roller. The device may also comprise, in combination with or as a replacement for the roller 18, another distribution means, for example a scraper. The device may also comprise a mobile compacting roller together with the distribution means in order to make the thickness of the powder distributed even more homogeneous.

During this step of depositing the first layer on the manufacturing plate 12, the distribution means of the layering device are translatably mobile along the working surface 12a in a feed or displacement direction illustrated schematically by the arrow referenced 20. The distribution means are displaced substantially parallel to the working surface 12a of the plate.

In a second step, an energy source (not represented) for example of laser type, emits a laser beam, the orientation of which is controlled by galvanometric mirrors (not represented). An optical lens (not represented) makes it possible to focus the laser beam in order to heat the layer of powder in a pattern corresponding to the cross section of the blade to be manufactured, and thus to selectively carry out the melting of the powder, in each zone of the manufacturing plate 12 on which a blade 10 should be manufactured.

During a third step, after the laser treatment step, a second layer is deposited on the first powder layer which is partly fused. The distribution means of the layering device are displaced substantially parallel to the direction of the largest dimension of each melted section of blade being manufactured. Next, the selective melting of the second powder layer is carried out. These steps are repeated again in order to form, by stacking of layers, the blades 10. The fused layers of each blade 10 extend substantially horizontally and are stacked on top of one another in a substantially vertical stacking direction.

As indicated above, the length $L_{10}$ of each blade 10 manufactured extends substantially vertically relative to the working surface 12a of the plate. The manufacture of the blades 10 is of vertical type. The length $L_{10}$ extends substantially parallel to the stacking direction. The length of the blade manufactured may extend along a direction forming an angle of between −20° and +20° with the stacking direction. The length of the main body 10a of the blade extends substantially vertically from the working surface 12a of the plate. The head 10b of the blade also extends substantially vertically from the working surface 12a of the plate. The head 10b protuding with respect to the frontal faces 14, 16 extends substantially perpendicular with respect to the working surface 12a. Thus, the blade 10 is free of undercut zones, i.e. zones where a portion of the blade 30 overhangs above a non-solidified powder zone.

The displacement direction 20 of the distribution means of the layering device is substantially parallel to the width ho of each blade 10 formed. The displacement direction 20 is substantially parallel to the direction of the largest dimension of the cross section of each blade 10. For a blade 10, the displacement direction 20 is parallel to the length of each fused layer of the stack.

Owing to the orientation of the fused layers for the manufacture of each blade 10 with respect to the displacement direction 20 of the distribution means of the layering device, the risk of deformations, in particular by bending, that may give rise to the appearance of stress concentration and microcrack phenomena is limited during the passage of these means over each layer. Moreover, this orientation makes it possible to obtain a good absorption of the forces applied by the distribution means with this vertical-type manufacture of the blade. With this type of manufacture, the obtaining of parts of complex shapes that comply with the required dimensional, geometric and surface finish features is facilitated.

Thus, for the majority of blades 10, it is not necessary to make provision for the formation of reinforcers that are in the form of overthicknesses formed integrally with the blade. For example, with such blades, lateral reinforcers may be provided only for a blade length greater than or equal to 30 mm and a thickness of the order of 0.4 mm, or else for curved blades having an offset greater than 5 mm between the upper and lower ends.

Furthermore, each blade 10 is oriented so that the distribution means of the layering device bear firstly against the main body 10a then next against the head 10b during the displacement thereof in the direction 20.

This enables a gradual increase in the friction between the roller of the layering device and the blades 10 being manufactured. Specifically, if the roller passes firstly over the heads 10b of the blades and then over their bodies 10a, the roller is abruptly subjected to high frictions, which may lead to damaging the blades 10 manufactured and optionally to blocking the roller and therefore giving rise to the shutdown of the machine.

As illustrated in FIG. 1, after manufacturing, the blades 10 are arranged on the plate 12 as a matrix of parallel columns and rows that are respectively positioned transversely and parallel to the displacement direction 20 of the distribution means of the layering device. In the exemplary embodiment illustrated, the blades 10 of each column and of each row are manufactured so as to be aligned relative to one another. As a variant, it is possible to make provision for the manufacture of the blades 10 so that, for one or for each column, each blade is offset in the displacement direction of the distribution means relative to the immediately adjacent blade. Such an arrangement makes it possible to avoid a deterioration of the blades being manufactured in the event of excessive friction of the distribution means on the first blades in contact with the roller. After manufacturing, the blades are detached from the manufacturing plate, for example by cutting by wire electrical discharge machining.

In the exemplary embodiment illustrated, the blades 10 have a general rectangular shape and are designed to enable the moulding of a water drop type pattern, given the shape of the heads 10b constituting the moulding portions of these blades.

Figure 3:
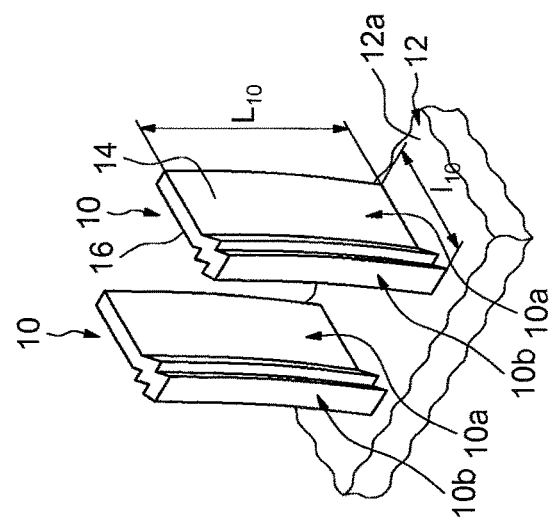

As a variant, it is possible to manufacture blades 10 each comprising a head 10b having other shapes, for example a corrugated head 10b as is represented in FIG. 3. In a manner analogous to the first exemplary embodiment illustrated, the head 10b protudes laterally on either side of the body 10a. The head 10b protudes with respect to the main faces 14, 16.

Figure 4:
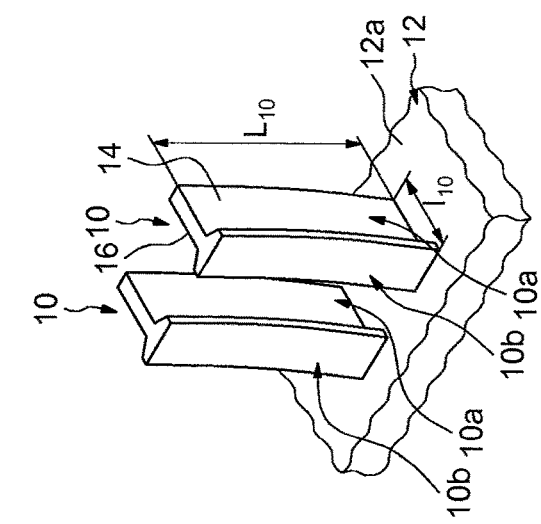

In another variant, it is also possible to manufacture blades 10 each comprising a head 10b that is inclined relative to the body 10a as is illustrated in FIG. 4. In this exemplary embodiment, the head 10b protudes solely relative to the main face 16. The design of the heads 10b of the blades is determined according to the type of pattern to be formed in the tread. Each head 10b may present at least one undercut shape and/or one shape bulkier than the body 10a.

The invention has been described on the basis of a laser sintering manufacture of a blade for a mould for vulcanizing tires. The invention may also be applied to any lining element of the mould intended to be added to a support block of the mould, or more generally to other types of small-sized parts used in different applications.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A process for the additive manufacturing of at least one part by powder sintering or melting using at least one beam of energy, said part comprising a main body provided with two opposite frontal faces and a one-piece head extending one end of the body, parallel to the length of said body and protruding at least with respect to one of said frontal faces, said process comprising the following steps:
   a) depositing at least one layer of powder on a working surface using a layering device comprising means for distributing the powder mobile in translation along said surface, and b) at least partly fusing said layer deposited using the beam of energy, c) repeating steps a) and b) in order to form the part by stacking of fused layers, said process being characterized in that:

the distribution means of said device are mobile in a direction substantially parallel to the direction of the length of each fused layer of the part, and steps a) and b) are repeated in order to form the part so that the length of said part extends along a direction substantially parallel to the stacking direction of the fused layers and so that the head of the part is oriented substantially perpendicular to the working surface, wherein the part is oriented so that the distribution means of the layering device bear firstly against the main body then next against the head of said part during the displacement thereof.

2. The process according to claim 1, wherein a plurality of stacks of fused layers are formed in different zones of the working surface so as to simultaneously manufacture a plurality of parts.

3. The process according to claim 2, wherein the plurality of parts are arranged on the working surface as a matrix of columns positioned transversely relative to the displacement direction of the distribution means of the layering device, and of rows positioned parallel to said direction.

4. The process according to claim 2, wherein the distribution means of the layering device are shared by the plurality of stacks of fused layers.

5. The process according to claim 2, wherein the parts of each column and of each row are aligned relative to one another.

6. The process according to claim 2, wherein each part of a column is offset along the displacement direction of the distribution means relative to the immediately adjacent part of said column.

7. The process according to claim 1, wherein the length of the part extends along a direction forming an angle of between −20° and +20° with the stacking direction of the layers.

8. The process according to claim 1, wherein the distribution means of the layering device comprise at least one roller.

9. The process according to claim 8, wherein the axis of the roller is oriented substantially perpendicular to the direction of the length of each fused layer of the part.

10. The process according to claim 1, wherein the part generally has a rectangular shape.

* * * * *